United States Patent [19]

Smith et al.

[11] Patent Number: 5,314,266

[45] Date of Patent: * May 24, 1994

[54] METHOD OF RECYCLING CONSTRUCTION AND DEMOLITION DEBRIS

[75] Inventors: R. Paul Smith, McLean, Va.; Michael I. Price, Upper Marlboro, Md.

[73] Assignee: Recovermat Technologies, Inc., Wilmington, Del.

[*] Notice: The portion of the term of this patent subsequent to Jan. 26, 2010 has been disclaimed.

[21] Appl. No.: 883,354

[22] Filed: May 15, 1992

Related U.S. Application Data

[63] Continuation-in-part of Ser. No. 871,103, Apr. 20, 1992, Pat. No. 5,181,803.

[51] Int. Cl.⁵ .............................................. B02C 15/00
[52] U.S. Cl. ........................ 405/129; 241/DIG. 38; 405/128
[58] Field of Search ........................ 405/128, 129, 303; 241/DIG. 38, 23, 24

[56] References Cited

U.S. PATENT DOCUMENTS

| | | |
|---|---|---|
| 2,015,361 | 7/1934 | Holland . |
| 3,113,014 | 12/1963 | Foth .............................. 241/DIG. 38 |
| 3,614,867 | 10/1971 | Nieman ............................. 405/129 |
| 3,705,851 | 12/1972 | Brauer ........................... 405/129 X |
| 3,826,437 | 7/1974 | Warren, Jr. et al. ........ 241/DIG. 38 |
| 4,483,641 | 11/1984 | Stoll . |
| 4,519,338 | 5/1985 | Kramer et al. . |
| 4,793,927 | 12/1988 | Meehan et al. . |
| 4,813,618 | 3/1989 | Cullom ........................... 241/DIG. 38 |
| 4,834,300 | 5/1989 | Wojciechowski et al. .... 405/129 X |
| 4,877,531 | 10/1989 | Burkett ....................... 241/DIG. 38 |
| 4,909,667 | 3/1990 | DeMello . |
| 4,927,317 | 5/1990 | Acosta . |
| 4,973,196 | 11/1990 | Fuhr et al. . |
| 5,024,770 | 6/1991 | Boyd et al. ...................... 405/129 X |
| 5,026,208 | 6/1991 | Beyer et al. ....................... 405/129 |
| 5,048,764 | 9/1991 | Flament ...................... 241/DIG. 38 |
| 5,051,031 | 9/1991 | Schumacher et al. . |
| 5,054,406 | 10/1991 | Judd . |
| 5,054,962 | 10/1991 | Bahnmuller et al. ............... 405/129 |
| 5,090,843 | 2/1992 | Grigsby . |
| 5,152,467 | 10/1992 | Hwang ....................... 241/DIG. 38 |

OTHER PUBLICATIONS

Vermeer, Mar. 1990, MR-425 Material Reducer.
"Soil Substitutes Slash Daily-Cover Needs,"0 MSW Management, p. 34 (Mar./Apr. 1992).
"Liner," Waste Age, pp. 30 and 32 (Mar. 1992).
"A Foam Fix for Trash," Chemical Week, p. 12 (Feb. 22, 1989).
"Old Christman Trees to be Reused," Business Wire (Dec. 12, 1991).
"DEQE Must Act to end Abandoned Car Crisis," PR Newswire (Jun. 27, 1988).
"Down in the Dump," Inc., p. 90 (Sep. 1990).
"Final Envionmental Impact Report on Artery Project Released," United Press International (Nov. 21, 1990).
"Technology: A New Way to Carve Out Space for Ever-Expanding Piles of Trash", New York Times (Dec. 30, 1990), Sec. 3, p. 9 & 11.
"Landfill Uses Old Newspapers as Daily Cover Material," Pollution Engineering, p. 122 (Sep. 1991).

(List continued on next page.)

*Primary Examiner*—Dennis L. Taylor
*Attorney, Agent, or Firm*—Wigman, Cohen, Leitner & Myers

[57] ABSTRACT

A method of recycling construction and demolition debris to produce an article suitable as a daily cover for a landfill is disclosed. The method generally comprises the steps of removing large pieces of metal from the debris, compacting the balance of the debris into small pieces, shredding the debris into smaller particles, separating the ferrous and optionally the non-ferrous metals from the debris utilizing the combination of magnetic, air and/or water separating systems, dewatering the shredded debris to produce a daily cover suitable for use as a daily cover for a landfill.

7 Claims, 1 Drawing Sheet

OTHER PUBLICATIONS

California proposed bill No. AB 1760, The Recorder (Mar. 18, 1991).

"Browning-Ferris Industries Officially Breaks Ground for Arbor Hills Center for Resource Management," PR Newswire (Sep. 20, 1991).

"Solid Waste-No Place to Go," Foundry Management & Technology, vol. 119, No. 5, p. 47 (May 1991).

"Landfill Laws Dump Business on Fluid Systems' Doorstep," Cincinnati Business Courier, vol. 8, No. 47, Sec. 1, p. 9 (Mar. 30, 1992).

"New York State Eyes Paper Mill Sludge as Alternative Landfill Cap-Integrated Waste Management", p. 7 (Apr. 15, 1992).

"Right From Your Backyard: Compost Makes a Comeback," PR Newswire (May 23, 1991), Sports News Section.

"Daily Cover is Where your Find It," Waste Age, p. 125 (Feb. 1988).

"Chemfix-Technologies: CFIX Announces Massachusetts Contract Worth $5.5 Million," Business Wire (Aug. 24, 1988).

"Maine Town Bucks Tradition in Landfill Capping Project," J. Air Waste Management Assoc., vol. 42, No. 4, p. 419 (Apr. 1992).

"Landfill Cover Helps Save Capacity," Public Works, p. 76 (Feb. 1992).

"To Shred or Not to Shred?" Waste Age, p. 114 (Jun. 1988).

"An In-Depth Look at Landfill Covers," Waste Age, p. 135 (Aug. 1987).

"Land Appliction of Waste Materials," Soil Conservation Society of America, pp. 175-178 at p. 176 (1976); TP995.56.

Carson, David A., "Municipal Solid Waste Landfill Daily Cover Alternatives," U.S. EPA-Risk Reduction Engineering Laboratory, Dec. 1991 pp. 296, 298.

40 C.F.R. Parts 257 and 258, Final Rule (promulgated Oct. 9, 1991, effective Oct. 9, 1993, except subpart G of Part 258 effective Apr. 9, 1994).

"Alternative Daily Cover Materials for Municipal Solid Waste Landfills," PRC Environmental Mgmt., Inc. McLean, Va. (Jun. 1, 1992).

Boeger, K. E., "Mill Fuel and Mill Cover Recycled Products from Shredder Fluff," Resources and Conservation (Mar. 14, 1987), from Material and Energy from Refuse, Selection of Papers Presented at the 3rd. Int. Symp., Antwerp, Belgium, Mar. 18-20, 1986, pp. 133-138.

Graven, Johannes T., "Urea-formaldehyde Foan as a Landfill Cover Material: Simulated Landfill Investigations," Waste Management Res., vol. 5, No. 1, pp. 41-53 (Mar. 1987).

Salimando, Joe, "Awesome or Awful?" Waste Age, p. 80 (Jan. 1990).

Ham, Robert K., "Refuse Milling for Landfill Disposal," technical report presented at the Solid Waste Symposium, Cincinnati, Ohio, p. 37(31) (May 4-6, 1971).

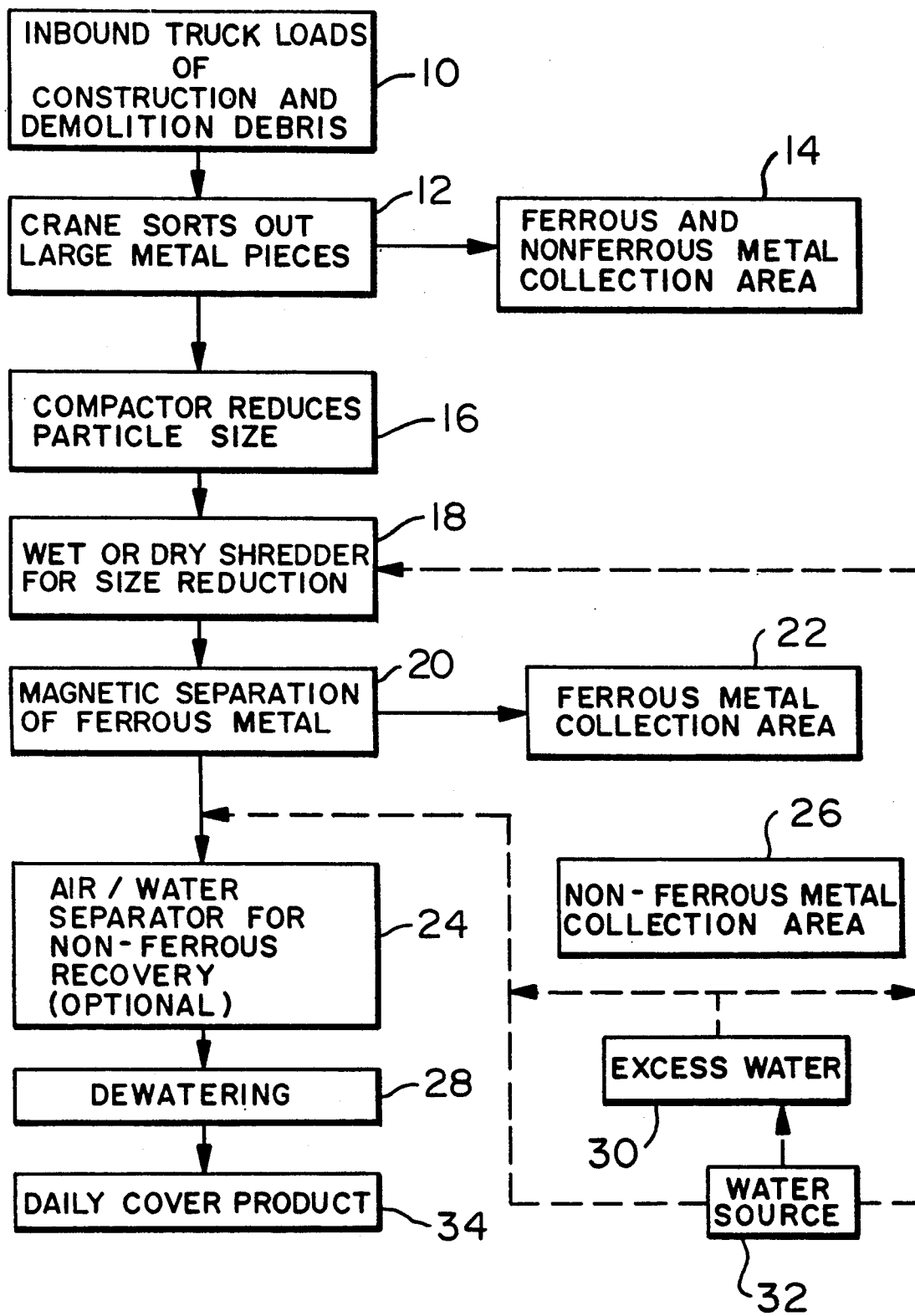

METHOD OF RECYCLING CONSTRUCTION AND DEMOLITION DEBRIS

CROSS-REFERENCE TO RELATED APPLICATION

This is a continuation-in-part of U.S. patent application Ser. No. 07/871,103 filed Apr. 20, 1992, now U.S. Pat. No. 5,181,803.

FIELD OF THE INVENTION

The present invention relates to a method of recycling construction and demolition debris and an article produced by the method. More particularly, the invention relates to a method of recycling construction and demolition debris into an article useful as a daily or periodic cover for a landfill.

BACKGROUND OF THE INVENTION

Federal and state environmental regulations require the operators of sanitary landfill operations to periodically cover disposed solid waste with six inches of earthen material to control disease, insects, fires, odors, blowing litter, and scavenging. For example, most jurisdictions require such covering of sanitary landfills at the end of each operating day, or at more frequent intervals if necessary. This covering requirement and the cover material is known as "daily cover" or "periodic cover" where the regulatory interval is more than one day, e.g., three days. As used herein, "daily cover" is intended to include daily and periodic cover for sanitary landfills, such as municipal solid waste (MSW) landfills, rubble landfills and land clearing debris landfills, and industrial waste landfills.

Each day's garbage, trash or rubble layer is covered at the end of the day and further garbage, trash or rubble layers are then spread directly on top of the daily cover for the previous day. In many landfill sites the soil used for the daily cover must be mined at the landfill site or purchased from an outside source and, due to the high rate of soil consumption, comprises a substantial cost item. Moreover, it has been recognized that multiple earth fill layers used in this way consume a significant volume of the valuable landfill space which might otherwise be used for receiving garbage, trash or rubble. It is well known that many communities are rapidly exhausting their available landfill acreage and it is therefore desirable to reduce the consumption rate of the available landfill volume. Accordingly, federal and state regulations allow alternative, more compressible, daily cover materials in lieu of the six inches of earthen material so long as the alternative materials provide the requisite level of protection.

Several such alternative daily cover materials are known in the art. One alternative, disclosed in U.S. Pat. No. 4,519,338 to Kramer et al, comprises hardenable plastic foam cover which is applied to the waste material by spraying. Similarly, companies such as 3M Environmental Protection Products of St. Paul, Minn., Chubb Environmental Security of Exton, Pa., and Russmer of Westchester, Pa., have all developed synthetic foams which can be sprayed onto a landfill face each day to function as a daily cover.

One disadvantage of such foam spray daily covers is that the high pressure spray equipment utilized to apply the foam tends to blow away the waste material to which it is applied. Additionally, the foam spray solution is expensive, typically 12 to 15 cents per square foot, substantially more expensive than dirt. Furthermore, weather restrictions, such as heavy rain or extreme cold and wind, hampers both the installation and performance of foam covers.

Another disadvantage of the foam daily cover substitutes is that it cannot be easily formulated from recycled materials. The increasing sensitivity towards the environment by society at-large has greatly increased the demand for using recycled products. State and municipal environmental officials, who operate or regulate most landfills, have been especially active in encouraging use of recycled products. Among the advantages of recycling is the fact that the waste material is converted into useful products rather than taking up rapidly depleting landfill space. Hence, such officials are making great efforts to integrate recycled materials into operations under control of their governments, including landfill operations.

Another alternative to using earthen material as a daily cover is disclosed in U.S. Pat. Nos. 4,909,667 to DeMello and 4,927,317 to Acosta. DeMello and Acosta disclose a geotextile or sheet-like member, such as canvas and the like, which is laid over the working face of a landfill at the end of the operating day. Similar geotextile daily covers include the Fabrisoil® non-woven polypropylene geotextile manufactured by the Phillips Fiber Corp. of Greenville, S.C. as well as the Sani-Cover ™ polypropylene geotextile manufactured by Amoco Fibers Corp. of Atlanta, Ga. A key disadvantage of geotextile covers is their expense which may be as high as $2.25 per square yard. In addition, geotextiles are subject to mechanical damage, such as tears, punctures and the like, require replacement or repair and are difficult to apply in inclement weather.

SUMMARY AND OBJECTS OF THE INVENTION

In view of the foregoing limitations and shortcomings of the prior art methods and daily cover materials, as well as other disadvantages not specifically mentioned above, it should be apparent that there still exists a need in the art for an alternative to conventional earthen material daily cover which is inexpensive, space saving, and made from recycled materials.

More particularly, it is an object of this invention to provide a daily cover alternative which is substantially more compressible than dirt.

It is another object of this invention to provide a daily cover alternative which is made entirely from recycled materials, in particular, construction and demolition debris.

Yet another object of this invention is to provide a method of disposing of construction and demolition debris in a manner that is economical, environmentally sound, and practical.

The aforementioned objects are accomplished according to the invention by a method of converting construction and demolition debris into daily cover for a landfill. "Construction and demolition debris," as used herein and as typically defined by state and municipal laws and ordinances, comprises debris associated with the razing of buildings, roads, bridges, and other structures and/or debris associated with the construction of buildings. It typically includes, but is not limited to, ferrous and non-ferrous metals, concrete, bricks, lumber, plaster and plasterboard, insulation material, cement, shingles and roofing material, floor, wall and ceiling tile, asphalt, glass, pipes and wires, carpet, wallpaper, felt and other items physically attached to the structure, including compacted appliances, structural fabrics, paper or cardboard packaging. The foregoing definition of construction and demolition debris is not intended to exclude debris, all or substantially all of which comprises paper, paperboard, paper cartons, cardboard and the like, such as is included, for example, in what is referred to in the art as "commercial waste." Commercial waste typically includes waste from office buildings, business establishments and other commercial enterprises which produce large quantities of paper, paper-based office-type waste and other waste products associated with such commercial enterprises, e.g., wooden crates and packing, metal, strapping, plastic, furniture, office equipment and glass. Thus, commercial waste is intended to be included in construction and demolition debris as that term is used herein. Typically excluded from construction and demolition debris are materials that pose an undue risk to public health or the environment such as industrial waste or byproducts, paint, tar, solvents, creosote, adhesives and the like.

It is not intended that the above listing of specific debris items be all-inclusive of the items of debris which may be incidentally present in construction and demolition debris. It is within the contemplation and scope of the present invention that limited or incidental amounts of other debris items may be present in construction and demolition debris without altering either its essential characteristics as construction and demolition debris or its suitability for recycling into daily cover according to the method of the invention. Such other debris items may include, e.g., tires, brush and limbs, rock, etc.

In some cases, construction and demolition debris must be deposited in what are commonly known as "rubble" landfills which are required to satisfy stringent design and operational requirements. However, according to the method of the present invention, the construction and demolition debris is converted into a useful byproduct which can be used as a daily cover for a sanitary landfill rather than being disposed of as the contents of a landfill. This daily cover can be used not only for municipal solid waste, land clearing debris and rubble landfills, but also for industrial waste landfills which are subject to even stricter regulation. Briefly described, the method of the invention comprises the steps of removing large pieces of metal from the debris, compacting the balance of the debris into small pieces, shredding the pieces into even smaller particles, separating the ferrous and optionally the non-ferrous metals from the debris utilizing a combination of magnetic, air and/or water separating systems, and dewatering the shredded debris to produce a daily cover suitable for use as a daily cover for a landfill.

The daily cover product of the present invention also advantageously functions as a more effective filter medium than the conventional earthen daily cover materials thereby resulting in a cleaner leachate arriving at the bottom of a landfill using the daily cover of the invention. The product of the method of the invention may thus be used in a landfill as daily cover and as a filter medium. Alternatively, the product may be used as a filter medium to filter a liquid stream in applications other than landfills as well as a filter medium for liquid streams in landfill operations.

A further advantage of the present invention resides in the fact that construction and demolition debris includes items, such as cement, concrete, plaster board and the like, containing calcium oxide or lime. The presence of these ingredients in a daily cover layer thus advantageously reduces the acidity level of the leachate reaching the bottom of the landfill site.

With the foregoing and other objects, advantages and features of the invention that will become hereinafter apparent, the nature of the invention may be more clearly understood by reference to the following detailed description of the invention, the appended claims and to the attached drawing.

BRIEF DESCRIPTION OF THE DRAWING

The drawing is a flow diagram in block form showing the present invention in the stages which can be used in the course of recycling the construction and demolition debris into daily cover.

DETAILED DESCRIPTION OF THE INVENTION

Referring now to the drawing wherein there is illustrated a flow diagram in block form showing the preferred stages utilized in the course of recycling construction and demolition debris according to the present invention.

The process begins with the transport of construction and demolition debris to a processing center as shown in block 10 of the drawing. After the construction and demolition debris arrives at the processing center, large pieces of metal are removed from the debris by a crane and placed in a collection area as shown in blocks 12 and 14 of the drawing.

The balance of the material is then moved to a "compacting" area where it is compacted as seen in block 16 of the drawing. Compacting is the process of reducing the size of the material ("presizing") to allow it to be more efficiently fed to and processed by a shredder. A wheel compactor machine is typically used for compacting. One suitable machine that has been found effective in this compacting or presizing process is the Ingersoll Rand 750 Wheel Landfill Compactor. This compactor has spiked wheels which grind and cut the debris into smaller pieces in the process of compacting it. Other types of compacting machines may also be used.

After compacting, the material is fed into a shredding apparatus as shown in block 18 where it is reduced to even smaller pieces having an average particle size of six inches or less and preferably an average particle size of three inches or less. As used herein, "average particle size" means the average sizes of all particles where the particle size is determined by the average of the particle dimensions. Thus, an individual particle may have a dimension well in excess of six inches so long as the average dimensions of that particle and all other particles average less than six inches, or preferably three inches.

The compacted debris is loaded onto a steel belt conveyor which transports the material into the inlet of the shredder. One shredder which has been found to be especially suitable for purposes of the invention is an automotive shredder known as the Newell Super Heavy Duty Shredder Model No. 80104TBD manufactured by Newell Industries, Inc. of San Antonio, Tex. The Newell shredder has a rotor diameter of 80" and a width of 104" and is powered by a 3000 hp electric motor. The Newell machine is a "wet shredder" because water is added directly into the shredding chamber which houses the rotor in order to prevent the emission of large clouds of dust that would otherwise be generated during the shredding process. Other shredders and crushers, including wet and dry shredders and crushers, may also be used so long as the required average particle size is attained. Super heavy duty shredders of the general type described above are particularly preferred because of their ruggedness and capacity to receive unshreddables without damage and to reduce the debris to an appropriate particle size.

To more efficiently reduce the construction and demolition debris to the appropriate particle size, ferrous metal items may be optionally added as a separate input stream to the shredder. Such additional ferrous metal items function in the shredder in a manner similar to the balls in a ball mill to enhance the shredding process.

After shredding, the shredded material preferably undergoes a magnetic separation process as shown in blocks 20 and 22 to remove ferrous metal which can be of commercial value. The magnetic separator is preferably a drum type electromagnetic separator of conventional design. After ferrous metals are removed, the shredded debris optionally undergoes an air or water separation process as shown in blocks 24 and 26 to recover valuable non-ferrous metals such as copper, aluminum, etc.

If a wet shredder is used, the shredded, non-metallic debris is then dewatered as shown in block 28 to remove excess water so that the resulting product has an acceptable moisture content. If a dry shredder is used, water is added to moisten the material to a desired moisture content so as to give it sufficient weight and consistency for use as daily cover. The moisture content may be in the range of about 5% to about 30% by weight, is preferably in the range of about 10% to 14% by weight and most preferably about 12% by weight. Excess water from the dewatering step is preferably reused in the shredding step 18 if a wet shredder is employed or piped to the water separation step 24 if a dry shredder is used. If a dry shredder is used in the shredding step 18 and the water separation step 24 is omitted, water 30 is added to the shredded debris to raise its moisture content to a level above the desired range before passing it to the dewatering step 28 to adjust the moisture content to the desired range. Dewatering is preferably accomplished in a dewatering press, but may be accomplished by other means or by natural drainage. A water source 32 is provided for supplying additional water to the excess water 30 or for directly supplying the wet shredder 18 and/or the water separator 24. Water flow is represented by dashed lines in the drawing.

The output of the dewatering step 28 is daily cover product 34 in the form of moist recycled construction and demolition debris. The article produced according to the method of the present invention is suitable as an alternative daily cover for all types of landfills including, municipal solid waste, land clearing debris, rubble, and industrial waste landfills.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A method of recycling construction and demolition debris comprising the steps of:
   providing a supply of construction and demolition debris;
   processing said debris through a shredder;
   during the processing of the debris through the shredder adding water to the debris so as to reduce said debris to a moist shredded product; and
   applying said moist shredded product to a landfill as daily cover.

2. The method of claim 1, wherein said product processing step includes shredding said debris so that the product has an average particle size less than about six inches.

3. The method of claim 2, wherein said processing step includes adding water to said debris so that the product has a moisture content of about 5% to 30% by weight.

4. The method of claim 1, including the step of separating ferrous metal from said debris after processing said debris through said shredder.

5. The method of claim 1, including the step of separating non-ferrous metal from said debris after processing said debris through said shredder.

6. The method of claim 1, including the step of adding ferrous metal items to said debris prior to processing said debris through said shredder.

7. The method of claim 1, including the step of compacting said debris prior to processing the debris through the shredder.

* * * * *